(12) United States Patent
Zhu et al.

(10) Patent No.: US 7,103,246 B1
(45) Date of Patent: Sep. 5, 2006

(54) COST-EFFECTIVE PACKAGING OF FIBER OPTICAL DEVICES

(75) Inventors: Steven Zhu, Fremont, CA (US); Chun He, Fremont, CA (US); Yao Li, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 10/913,938

(22) Filed: Aug. 7, 2004

(51) Int. Cl.
*G02B 6/32* (2006.01)
(52) U.S. Cl. .......................................... 385/34; 385/33
(58) Field of Classification Search ............. 385/33–34
See application file for complete search history.

(56) References Cited

U.S. PATENT DOCUMENTS

| | | | |
|---|---|---|---|
| 6,148,126 A | 11/2000 | Zheng | |
| 6,185,347 B1 | 2/2001 | Zheng | |
| 6,246,812 B1 | 6/2001 | Liu | |
| 6,246,813 B1 | 6/2001 | Zheng | |
| 6,282,339 B1 | 8/2001 | Zheng | |
| 6,396,980 B1 | 5/2002 | Liu | |
| 6,404,954 B1 | 6/2002 | Zhu | |
| 6,443,633 B1 | 9/2002 | Liberty | |
| 6,454,465 B1 * | 9/2002 | Uschitsky et al. ............ 385/79 |
| 6,498,876 B1 | 12/2002 | Liu | |
| 6,532,325 B1 | 3/2003 | Liu | |
| 6,546,169 B1 * | 4/2003 | Lin et al. ...................... 385/39 |
| 2003/0063853 A1 | 4/2003 | Huang | |
| 2003/0103725 A1 | 6/2003 | Li | |
| 2004/0001713 A1 | 1/2004 | Ting | |
| 2004/0086226 A1 * | 5/2004 | Hellman et al. ............... 385/33 |
| 2004/0208442 A1 * | 10/2004 | Shi et al. ...................... 385/34 |

* cited by examiner

*Primary Examiner*—Frank G. Font
*Assistant Examiner*—Eric Wong
(74) *Attorney, Agent, or Firm*—Joe Zheng (57) ABSTRACT

Techniques for designing optical couplers are disclosed. According to one aspect of the optical couplers, different from the prior art couplers, a holding tube (a sub-assembly) for holding an optical lens (e.g., a GRIN lens) and an optical filter (e.g., a thin film filter) is formed by concatenating two single tubes, one for accommodating the optical lens and the other for accommodating the optical filter. The two tubes are not required to have an identical dimension. As a result, inherent flexibilities are provided in the holding tube, especially the optical filter often comes in different sizes. Further, when the sub-assembly is inserted in a sleeve, only either one of the two tubes is secured to the sleeve so as to reduce a risk that, during a thermal condition change, any metal and glass material expansion will not cause the sub-assembly to be under stress that would otherwise be present when both of the tubes are secured to the sleeve. To reduce stress-related optical loss of the optical couplers, an epoxy adhesive is applied onto only a portion of an optical lens and a portion of a tube.

23 Claims, 6 Drawing Sheets

Prior Art

Prior Art

COST-EFFECTIVE PACKAGING OF FIBER OPTICAL DEVICES

BACKGROUND OF THE INVENTION

1. Field of the Invention

The invention is generally related to the area of optical components and devices for optical communications. In particular, the present invention is related to techniques for packaging optical components and devices in compact size and more economic way without compromising overall performance of such components and devices.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber. To take the benefits and advantages offered by the WDM system, there require many sophisticated optical network elements.

Optical add/drop and multiplexer/demultiplexer devices are those elements often used in optical systems and networks. For example, an exchanging of data signals involves the exchanging of matching wavelengths from two different sources within an optical network. In other words, an add/drop device can be advantageously used for the multi-channel signal for dropping a wavelength while simultaneously adding a channel with a matching wavelength at the same network node. Likewise, for transmission through a single fiber, a plurality of channel signals are combined via a multiplexer to be a multiplexed signal that eventually will be separated or demultiplexed via a demultiplexer.

Figure 1A:
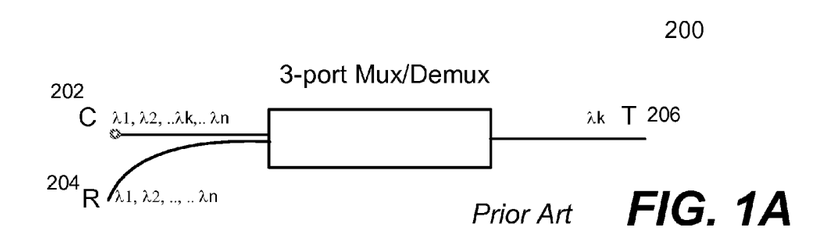
FIG. 1A shows a typical design of a three-port add/drop device.

A fundamental element in an add/drop device or a multiplexer/demultiplexer is what is called a three-port device. As the name suggests, a three-port device has three ports, each for a multi-channel signal, a dropped or added signal or a multi-channel signal without the dropped or added signal. FIG. 1A shows a typical design of a three-port add/drop device 200. The optical device 200 includes a common (C) port 202, a reflection (R) port 204, and a transmission (T) port 206. When the device 200 is used as a multiplexer (i.e., to add a signal at a selected wavelength $\lambda_K$ to other signals at wavelengths other than the selected wavelength $\lambda_K$), the T-port 206 receives a light beam at the selected wavelength $\lambda_K$ that is to be multiplexed into a group of beams at wavelengths $\lambda_1, \lambda_2, \ldots \lambda_N$ excluding the selected wavelength $\lambda_K$ coupled in from the C-port 202. The R-port 204 subsequently produces a multiplexed signal including all wavelengths $\lambda_1, \lambda_2, \ldots \lambda_K, \ldots \lambda_N$.

Likewise, when the optical device 200 is used to demultiplex signals, the C-port 202 receives a group of signals with wavelengths $\lambda_1, \lambda_2, \ldots \lambda_K, \ldots \lambda_N$. The T-port 206 produces a signal with the selected wavelength $\lambda_K$ while the R-port 204 subsequently produces a group of signals including all wavelengths $\lambda_1, \lambda_2, \ldots \lambda_N$ except for the selected wavelength $\lambda_K$. In general, the optical paths towards a R-port and a T-port are respectively referred to as R-channel and T-channel.

Figure 1B:
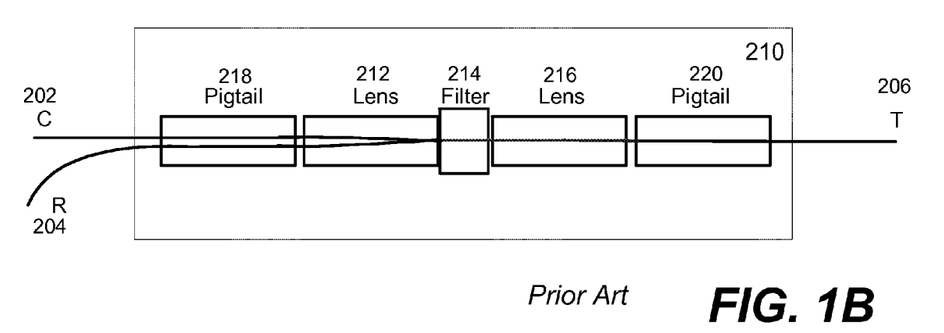
FIG. 1B shows an exemplary internal configuration of the optical device of FIG. 1A.

FIG. 1B shows an exemplary internal configuration 210 of the optical device 200 of FIG. 1A. As shown in FIG. 1B, there is a first GRIN lens 212, an optical filter 214 (e.g., a multi-layer thin film filter) and a second GRIN lens 216. In general, a dual-fiber pigtail is provided in a holder 218 (e.g., a dual-fiber pigtail collimator) and coupled to or positioned towards the first GRIN lens 212, and a single-fiber pigtail is provided in a second holder 220 and coupled to or positioned towards the second GRIN lens 216. Essentially the two GRIN lenses 212 and 216 accomplish the collimating means for coupling an optical signal with multi channels or wavelengths in and out of the C port 202, the R port 204, or the T port 206. In general, the three-port device 200 is known to have a very low coupling loss from the C-port to both the R-port and the T-port for use as a demultiplexing device, or vise versa as a multiplexing device.

The performance, reliability and cost of such devices are primarily controlled by the designs and packaging technologies thereof. U.S. Pat. No. 6,282,339 has reviewed two kinds of design and packaging technologies of wavelength division multiplexed (WDM) couplers and lists their respective problems. Accordingly, U.S. Pat. No. 6,282,339 discloses an improved design and process for fabricating a low-cost WDM coupler with improved reliability by preventing the epoxies to spread over or diffused into the optical paths in the coupler. By eliminating the epoxies from all the optical paths, the difficulties and limitations in the two kinds of design and packaging technologies can be fully overcome.

Figure 2A:
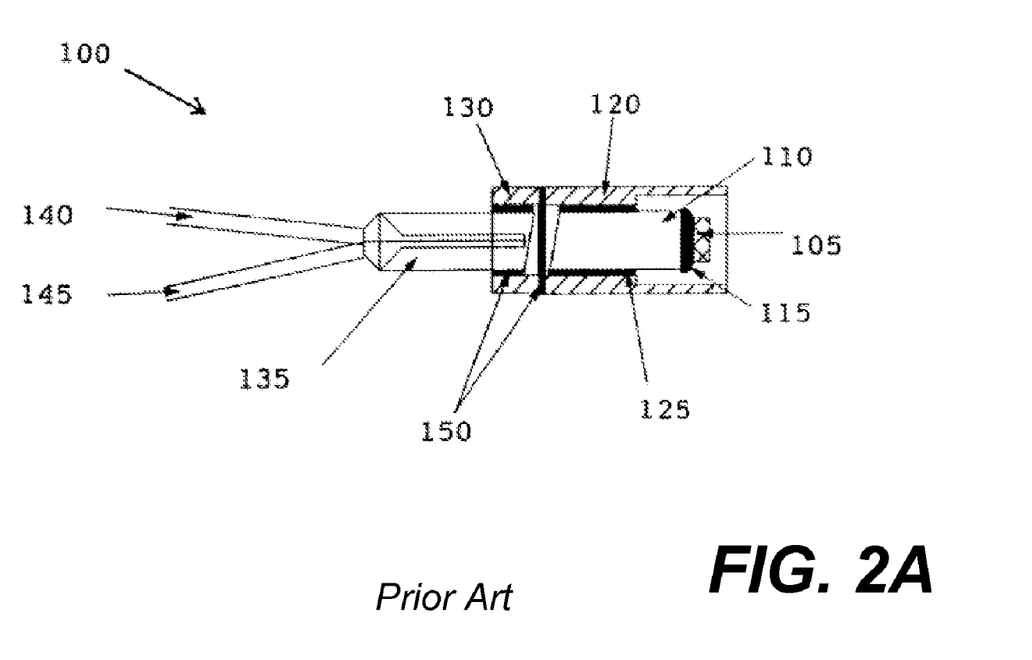
Figure 2B:
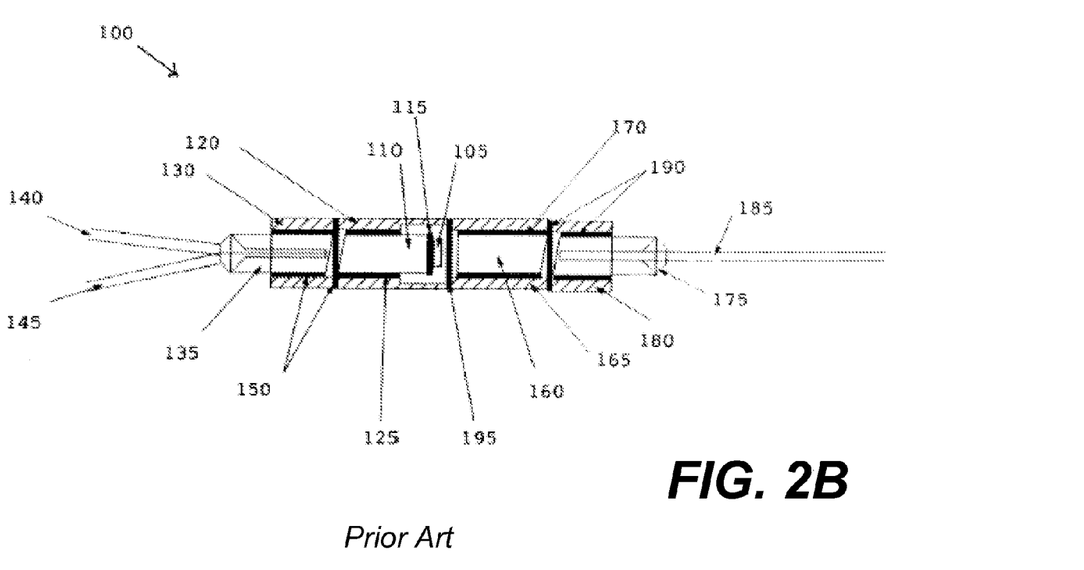

FIG. 2A and FIG. 2B respectively duplicate FIG. 2A and FIG. 2B of U.S. Pat. No. 6,282,339. In FIG. 2A, a WDM filter 105 is attached to a first GRIN lens 110 by applying a first heat-curing epoxy 115. To prevent the epoxy from entering the optical path between the WDM filter and the GRIN lens, an EP42HT heat-curing epoxy is employed as the first heat-curing epoxy 115. The EP42HT epoxy has good resistance to high temperature and humidity. For the purpose of completely preventing the EP42HT epoxy from entering the optical path between the WDM filter and the GRIN lens in any situation, a special bonding and curing process is developed. The EP42HT epoxy is first prepared and then gelled at room temperature for about two hours. Then the EP42HT epoxy is applied to the boundary areas between the WDM filter and the GRIN lens. Then the EP42HT epoxy is further gelled at room temperature for another one hour. Finally, the EP42HT epoxy is cured at 110C for another one hour. According to this manufacturing process, the EP42HT epoxy will enter only the very outside interface areas between the WDM filter and the GRIN lens to provide bonding between the WDM filter and the GRIN lens but not the optical path between the WDM filter and the GRIN lens. To obtain strong bonding between the WDM filter and the GRIN lens, a certain amount of the EP42HT epoxy is applied around the interface area between the WDM filter and the GRIN lens. Usually, the diameter of the EP42HT epoxy bonding will be slightly larger than that of the GRIN lens.

After the WDM filter 105 is attached to the first GRIN lens 110, the first GRIN lens 110 attached to the WDM filter 105 is inserted into a first holding tube 120. The first holding tube 120 has a length slightly longer than the combined length of the WDM filter 105 and the first GRIN lens 110. The first GRIN lens 110 and the WDM filter 105 is fixed to the first holding tube 120 by applying a second heat curing epoxy 125. Since the diameter of the epoxy bonding 115 is slightly larger than that of the first GRIN lens 110, the holding tube 120 has larger inside diameter at the side of the epoxy bonding 115 than at the other side. After a second holding tube 130 is mounted onto a dual fiber pigtail 135, the filter 105, the lens 110, and the tube 120 sub-assembly and the fiber pigtail 135 with the holding tube 130 are mounted on an alignment stage (not shown). Then a distance and orientation of the fiber pigtail 135 relative to the GRIN lens 110 is adjusted to achieve a lowest reflection loss from the input fiber 140 to the output fiber 145. After the fiber pigtail 135 is placed at its optimal position relative to the GRIN lens 110, the position of the holding tube 130 is adjusted so that its end surface is in contact with that of the holding tube 120. Then a third heat-curing epoxy 150 is applied to fix the fiber pigtail 135 and the two holding tubes 120 and 130 together and thus an assembly of a dual fiber collimator 155 is completed. After the epoxy 150 is applied, it will spread over all contact areas between the holding tube 130 and the fiber pigtail 135 and between the holding tubes 120 and 130. However, it will not contaminate the optical path between the GRIN lens 110 and the fiber pigtail 135 because of surface tension.

In FIG. 2B, a second GRIN lens 160 is inserted and fixed into a third holding tube 165 having a length slightly longer than that of the GRIN lens 160 by applying a fourth heat-curing epoxy 170. Then a single fiber pigtail 175 is inserted into a fourth holding tube 180. The single fiber pigtail 175 is a low-cost standard single fiber pigtail, like that used in the pending patent application. Then the first holding tube 120 with the first GRIN lens 110 and the WDM filter 105, the third holding tube 165 with the second GRIN lens 160 and the fourth holding tube 180 with the single fiber pigtail 175 are mounted on an alignment stage (not shown). A pigtail position-adjustment is made on the alignment stage to achieve optimal positions of the first GRIN lens 110 to the second GRIN lens 160 and the single fiber pigtail 175 to the second GRIN lens 160 with a lowest transmission loss.

However, it has been noticed that the approach disclosed in U.S. Pat. No. 6,282,339 demonstrate at least the following problems that can, in return, complicate the designs and introduce costs in packaging an optical device (e.g., a WDW coupler). First of all, the device 100 in FIG. 2A or FIG. 2B requires that the first holding tube 120 (i.e., a glass tube) that packages the WDM filter 105 and the GRIN lens 110 has to be made with two distinctive cross-sections (e.g., different diameters). A smaller inner diameter section is to match to that of the GRIN lens 110 (e.g., 1.8 mm diameter) and the larger inner diameter section is to accommodate the WDM filter 105 that is typically in a square cross-section shape. For a variety of applications, such a filter may have to be in different square sizes due to coating stress concerns. Some of the most popular sizes used in the industry are 1.4×1.4 mm, 1.6×1.6 mm, 1.9×1.9 mm. Thus the attached GRIN lens and filter combination can have various different cross-sections (e.g., ~1.98 mm, ~2.26 mm, and ~2.69 mm, respectively, if the popular sizes are used). Making these types of glass tubes in large quantity will inevitably become a costly problem since the most inexpensive method to make a glass tubing is through extrusion. Finally, tube segments are formed by cutting and end polishing.

Another problem is the stress-induced power loss that may experienced in the device 100 in FIG. 2A or FIG. 2B. The bonding of the GRIN lens 110 to the holding tube 120 (so is the bonding of the GRIN lens 160 to the holding tube 165) is done by thermally cured epoxy. The use of the thermally cured epoxy takes a substantial time and such epoxy typically puts some stress on materials being bonded. However, the stress can slightly change the optical property of the GRIN lens, thereby inducing an undesirable optical power loss.

Accordingly, there is a great need for techniques for providing optical couplers of consistent performance, reliability and low cost. Such devices so designed are amenable to small footprint, broad operating wavelength range, enhanced impact performance, lower cost packaging, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for adding or dropping a selected wavelength or a group of wavelengths as well as multiplexing a plurality of signals into a multiplexed signal or demultiplexing a multiplexed signal into several signals. The devices performing such are referred to as optical couplers or couplers. For simplicity, a group of selected wavelengths or channels will be deemed or described as a selected wavelength hereinafter. According to one aspect of the present invention, different from the prior art couplers, a holding tube for holding an optical lens (e.g., a GRIN lens) and an optical filter (e.g., a thin film filter) is formed by concatenating two single tubes, one for the optical lens and the other for the optical filter. The two tubes are not required to have an identical dimension. In one embodiment, both tubes have two different inner and outer diameters within a predefined range. As a result, inherent flexibilities are provided in the holding tube, especially the optical filter often comes in different sizes.

According to another aspect of the present invention, the holding tube (a sub-assembly) has at least two sections (i.e., two tubes) that are different in size and specification. When such holding tube is inserted in a metal case (or tube) or sleeve, only one of the two sections is secured to the sleeve so as to reduce a risk that, during a thermal condition change, any metal and glass material expansion will not cause the sub-assembly to be under stress that would otherwise be present when both of the sections are secured to the sleeve.

According to still another aspect of the present invention, the optical lens is secured to a tube by applying an appropriate amount of an epoxy adhesive to only a portion of the optical lens and the tube to reduce a stress-related optical loss. In one embodiment, the epoxy adhesive is applied to roughly a half of the length of the tube.

According to yet still another aspect of the present invention, different from the prior art optical devices that use all GRIN lenses, the present invention uses one GRIN lens and one C-lens due to the fact that C-lens is relatively less expensive, and has low insertion loss in long working distance and wide working distance range.

According to yet still another aspect of the present invention, the two single tubes to form a holding tube are concatenated slightly off an axis of either one of the tubes to compensate for possible front surface curvature variance of the C-lens without compromising bonding strength of the tubes.

The present invention may be used in many areas, such as optical communications and devices, and can be implemented in many ways as a subsystem, a device or a method. According to one embodiment, the present invention is an optical apparatus comprising: a first holding tube formed by concatenating and bonding a first tube and a second tube with an epoxy adhesive, the first tube provided to accommodate a first optical lens, the second tube provided to accommodate an optical filter, wherein the first tube and the second tube have two different dimensions; and a second holding tube, provided to accommodate a second optical lens, concatenated and bonded with the first holding tube. The first optical lens is secured to the first tube by applying an epoxy adhesive only to a portion of the first optical lens and a portion of the first tube to reduce a stress-related optical loss. The first optical lens is a GRIN lens and the second optical lens is a C-lens.

According to another embodiment, the present invention is an optical apparatus comprising: a first glass tube provided to accommodate a GRIN lens; a second glass tube provided to accommodate an optical filter, the first glass tube and the second glass tube being concatenated and bonded to form a holding tube, wherein the first glass tube and the second glass tube have two different dimensions; and a third glass tube, provided to accommodate a lens (e.g., a GRIN lens or a C-lens), concatenated and bonded to the holding tube to form a sub-assembly, wherein, when the sub-assembly is inserted in a sleeve, only either one of the holding tube and the third tube is secured to the sleeve to reduce a risk that, during a thermal condition change, any metal and glass material expansion will not cause the sub-assembly to be under stress that would otherwise be present when both of the holding tube and the third tube are secured to the sleeve.

According to still another embodiment, the present invention is a method for providing an optical apparatus, the method comprising: forming a sub-assembly of a GRIN lens and an optical filter; inserting the GRIN lens of the sub-assembly into a first glass tube; concatenating a second glass tube to the first glass tube by bonding both of the tubes to form a holding tube, wherein the first glass tube and the second glass tube have two different dimensions; and inserting another lens (e.g., a GRIN lens or a C-lens) in a third glass tube, the third glass tube concatenated and bonded to the holding tube to form a sub-assembly, wherein, when the sub-assembly is inserted in a sleeve, only either one of the holding tube and the third tube is secured to the sleeve to reduce a risk that, during a thermal condition change, any metal and glass material expansion will not cause the sub-assembly to be under stress that would otherwise be present when both of the holding tube and the third tube are secured to the sleeve.

One of the objects, features, advantages of the present invention is to provide an optical coupler of consistent performance, reliability and low cost. Such devices so designed are amenable to small footprint, broad operating wavelength range, enhanced impact performance, lower cost packaging, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

FIG. 2A and FIG. 2B respectively duplicate FIG. 2A and FIG. 2B of U.S. Pat. No. 6,282,339;

DETAILED DESCRIPTION OF THE PREFERRED EMBODIMENT

The present invention pertains to new designs of optical devices particularly useful for adding or dropping a selected wavelength or a group of wavelengths as well as multiplexing a plurality of signals into a multiplexed signal or demultiplexing a multiplexed signal into several signals. According to one aspect of the optical couplers, different from the prior art couplers, a holding tube (a sub-assembly) for holding an optical lens (e.g., a GRIN lens) and an optical filter (e.g., a thin film filter) is formed by concatenating two single tubes, one for accommodating the optical lens and the other for accommodating the optical filter. The two tubes are not required to have an identical dimension. As a result, inherent flexibilities are provided in the holding tube, especially the optical filter often comes in different sizes. Further, when the sub-assembly is inserted in a sleeve, only either one of the two tubes is secured to the sleeve so as to reduce a risk that, during a thermal condition change, any metal and glass material expansion will not cause the sub-assembly to be under stress that would otherwise be present when both of the tubes are secured to the sleeve. To reduce stress-related optical loss of the optical couplers, an epoxy adhesive is applied onto only a portion of an optical lens and a portion of a tube.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 3A:
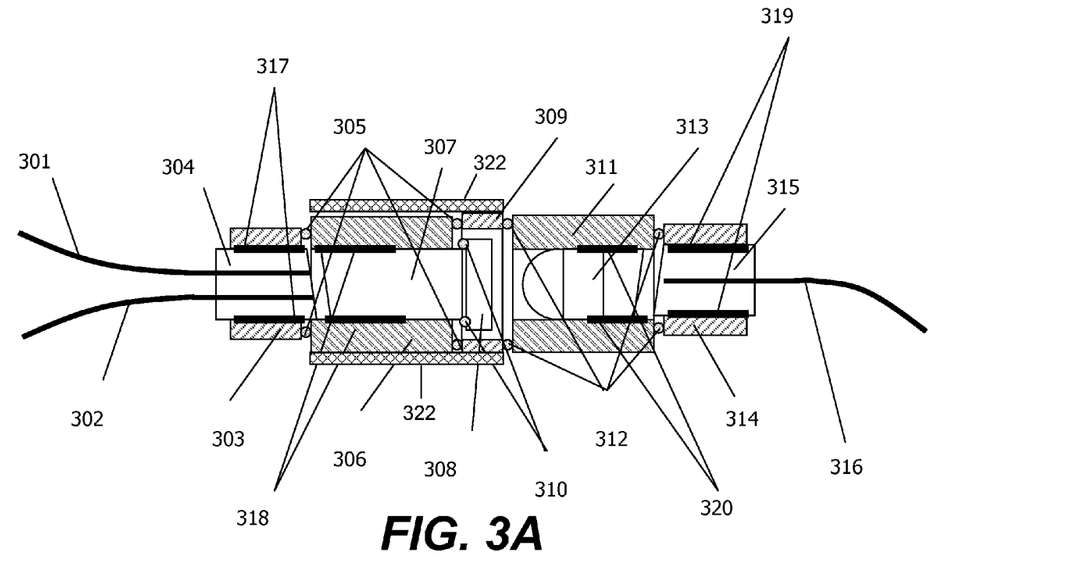
FIG. 3A shows an exemplary design according to one embodiment of the present invention.

Referring now to the drawings, in which like numerals refer to like parts throughout the several views. FIG. 3A shows an exemplary design of a three-port coupler 300 according to one embodiment of the present invention. One of the key features in the present invention, for example, in view of U.S. Pat. No. 6,282,339, is that no single tube employed to accommodate optical components would have to be made to have different cross-sections. It is understood to those skilled in the art that it is an expensive process in glass fabrication to make a glass holding tube with different cross-sections.

According to one embodiment, there are five different single tubes 303, 306, 309, 311 and 314, each has corresponding predetermined sizes (e.g., dimension and length) and may be fabricated separately. Although other material may be used, the tubes 303, 306, 309, 311 and 314 are of glass type in the description herein. Without implied limitations, the tubes 303, 306, 309, 311 and 314 will be referred to as glass tubes.

The glass tube 303 is provided to accommodate a pigtail fiber 304 with two fiber cores 301 and 302 and bonded with a type of epoxy adhesive 317. Likewise the glass tube 314 is provided to accommodate a fiber 315 with a fiber core 316 and bonded with a type of epoxy adhesive 319. The epoxy adhesive in either application may be identical or different. Either an thermal or UV curable epoxy adhesive may be used. An exemplary epoxy adhesive is EP42HT epoxy. Different from the prior art couplers, in one embodiment, the tube 311 is provided to accommodate a C-lens, the detail of which will be provided below.

As shown in FIG. 3A, a glass holding tube 322 is formed with two separate tubes 306 and 309. The glass holding tube 322 is essentially a sub-assembly of two sections (e.g., glass tubes with inserted parts). The tube 306 has an inner dimension (or diameter if it is of round shape) to accommodate a GRIN lens 307 and the tube 309 has a different inner diameter to accommodate an optical filter 308, wherein the optical filter 308 may be a thin film filter or other low cost filter that can meet a desired requirement, such as to reflect a particular channel signal. In other words, the tubes 306 and 309 have different inner cross sections. In general, the cross sections are substantially of round shape, therefore, the tubes 306 and 309 have different inner diameters. Preferably, the tubes 306 and 309 have slightly different outer diameters such that the tubes 306 and 309 can have a physical contact when they are concatenated. In other words, the thickness of one of the tubes (preferably the tube 306) is thicker than that of the other to guarantee the physical contact so that they can be bonded together to form the glass holding tube 322.

In one embodiment, the inner diameter and the outer diameter of the tube 306 can be around 1.81 mm and 3.5 mm, respectively, while the inner diameter and the outer diameter of the tube 309 can be approximately 2.3 mm and 3.4 mm, respectively. As such, even when the tube 309 is slightly offset from the axis of the glass holding tube 322 to compensate the needed alignment in radius by about 100 um, the overall contact area between the two tubes may still be maintained and this area is considered to be designed to be larger than the critical bond area between the two tubes under allowed shear force.

Figure 3B:
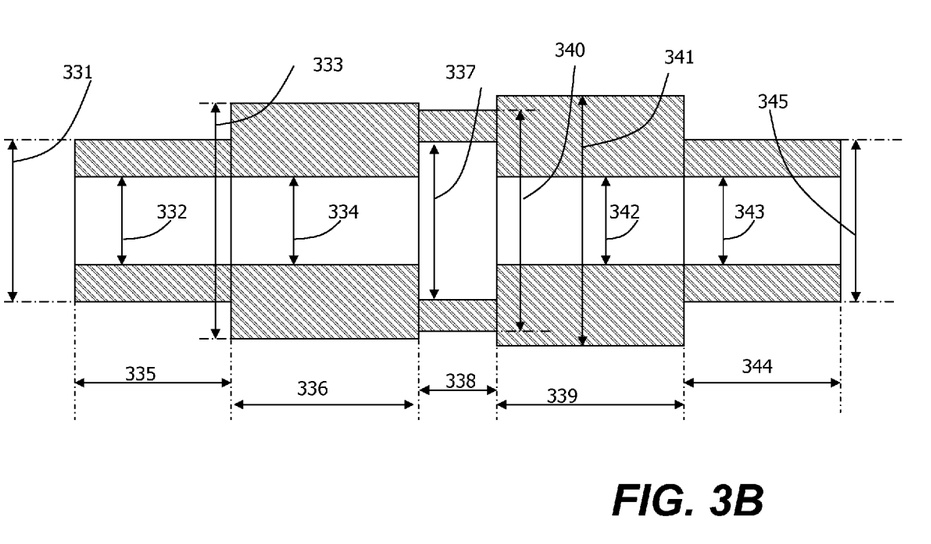
FIG. 3B shows a corresponding cross-section view of the design of FIG. 3A with indicated inner and outer diameters.

One of the advantages of using this dual tube combination is the inherent flexibility of mounting an optical filter with a size up to 1.6×1.6 mm$^2$ in one embodiment. For example, referring to FIG. 3B, there shows a corresponding cross-section view of the coupler 300 of FIG. 3A, to accommodate a square shaped filter with an area of $B_f \times B_f$, a GRIN lens diameter of $D_{GRIN}$, a critical bonding area of $A_{crytical}$ and an alignment tolerance of $\Delta_{offset}$, the inner diameter (ID) and outer diameter (OD) of the tube 306 and 309 can be designed, in reference to FIG. 3B, as follows:

$$ID_{337} \geq \sqrt{2}\, B_f$$

$$OD_{340} \geq \sqrt{\frac{4 A_{crytical}}{\pi} + 2 B_f^2}$$

$$ID_{334} \geq D_{GRIN}$$

$$OD_{333} \geq \sqrt{\frac{4 A_{crytical}}{\pi} + 2 B_f^2} + \Delta_{offset}$$

Unlike the prior art couplers that use a glass holding tube 125 that has the same geometry and specification as the tube 160 shown in FIG. 2B, the glass holding tube 322 in the present invention is a combination of two tubes 306 and 309 and is not necessary identical to that of the tube 311 in geometry. In one embodiment, the tube 311 with a slightly larger outer diameter (OD) 341 is used. This larger OD is used to guarantee that the entire assembly of the coupler 300 has the largest OD at the tube 311. Providing such a design can help ensure that once the entire glass-tubing assembly is made and to be inserted to a metal-based outer tube or sleeve to complete the final packaging, the firm contact between the glass and metal assembly will only occur at the section 311. One of the advantages, benefits and objects for such design is to reduce the risk that during thermal condition change, such as in severe operating or storage environments, any metal and glass material expansion will not cause the optical assembly to be under stress at two different glass tube locations. Such a stress is often the cause of TDL, non-desirable performance characteristics.

Figure 3C:
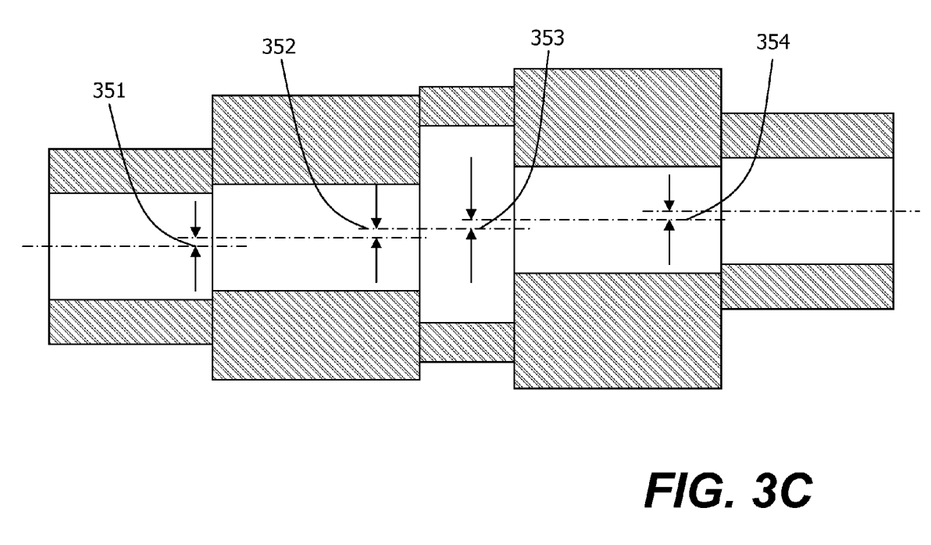
FIG. 3C shows various tolerances in tubes of the design of FIG. 3A.

Referring now to FIG. 3C, there show various tolerances among the tubes 303, 306, 309, 311 and 314 with respect to the optical axis of the tube 314, the OD 341 of FIG. 3B is calculated by knowing transversal inter-tubing alignment tolerances 352, and 353 and can be expressed as the following functions:

$$OD_{341} > OD_{332} + \Delta_{352} + \Delta_{353}$$

Within the tolerances, two or more of the tubes 303, 306, 309, 311 and 314 can be concatenated slightly off an axis thereof to compensate for possible front surface curvature variance of a C-lens without compromising bonding strength of the tubes.

To further reduce the cost of the coupler, a C-lens is used in one embodiment of the present invention. As shown in FIG. 3A, the tube 311 accommodates a C-lens 313. It is known in the art that a C-lens is a plano-convex lens structure and typically has only one beam focusing surface. A C-lens is often used to provide a fiber collimating means. One major difference between a GRIN lens and a C-lens is that the former typically needs to be interfaced directly with another component, such as a fiber pigtail device or a filter, while the latter can allow a short free-space distance at one of its two ends. Further a C-lens has several advantages over a GRIN lens, including low cost, low insertion loss in long working distance, and wide working distance range. In terms of cost, a GRIN lens is usually more expensive than a C-lens. Nevertheless, one of the issues with a C-lens is the front surface curvature that is sometimes difficult to be controlled.

However, in this invention and for many 3-port filter applications, a precise control of the front surface curvature is less concerned. The reason is that any reasonable curvature deviation of the C-lens front surface can be compensated by an off-axis alignment between the glass tubes 311 and 314. The offset 354 shown in FIG. 3B is typically within 100 um. An exemplary assembly process is to align the C-lens 313 and the fiber 315 in the final step before fixing them by an epoxy adhesive. In addition, the tube structure allows a stable fixation of the entire assembly even though there is a relatively large air gap between the C-lens front surface and the filter.

To minimize the hazardous TDL problem so that the 3-pott filter assembly can potentially be used in an uncontrolled environment, such as from −40° C. to 85° C., it is essential to minimize the device internal stress whenever applicable. It is known that an epoxy adhesive, especially thermally cured epoxy, often provides large stress over the bonding surfaces. Such stress can often cause the glass property to change, thereby inducing the stress-related optical loss. In many prior art devices including that disclosed in U.S. Pat. No. 6,282,339, this factor is largely ignored. According to one embodiment of the present invention, the less stress sensitive regions, such as surfaces between the glass tube 317 and the pigtail 219 are still filled with a certain amount of epoxy. But in the more stress-sensitive regions like those between the GRIN lens 307 and the glass tube 307, the epoxy is applied only at the half of the tube length 336 (towards the fiber pigtail end). For the same reason, epoxy is applied between the C-lens 313 and its tube 311 at the region 320 toward the pigtail 315 half. Using these epoxy reduction schemes, various tests results have shown that the TDL problem is significantly reduced.

The present invention may be implemented in many ways, for example, as an apparatus, a system or a method and provides flexibilities in assembling final devices. While the present invention has been described with reference to specific embodiments, the description is illustrative of the invention and is not to be construed as limiting the invention. For example, in one embodiment, the C-lens is simply replaced by another type of optical lens (e.g., a GRIN lens or a ball lens), the device so constructed still possesses some of the important features contemplated in the present invention. Likewise, the C-lens 313 and the GRIN lens 307 may be swapped with modifications to bonding the filter 308 properly to the newly located GRIN lens (in which case the holding tube is for the transmission channel). Accordingly, various modifications to the present invention can be made to the preferred embodiments by those skilled in the art without departing from the true spirit and scope of the invention as defined by the appended claim.

We claim:

1. An optical apparatus comprising:
    a first holding tube formed by concatenating and bonding a first tube and a second tube with an epoxy adhesive, the first tube provided to accommodate a first optical lens, the second tube provided to accommodate an optical filter, wherein the first tube and the second tube have two different dimensions; and
    a second holding tube, provided to accommodate a second optical lens, concatenated and bonded with the first holding tube, wherein the first holding tube and the second holding tube are to be concatenated.

2. The apparatus of claim 1, further comprising:
    a third tube, provided to accommodate a fiber pigtail with two fiber cores, concatenated and bonded with the first holding tube; and
    a fourth tube provided to accommodate a fiber with one fiber core, concatenated and bonded with the second holding tube.

3. The apparatus of claim 2, wherein the first optical lens is secured to the first tube by applying an epoxy adhesive only to a portion of the first optical lens and a portion of the first tube to reduce a stress-related optical loss.

4. The apparatus of claim 2, wherein the first optical lens is a GRIN lens and the second optical lens is a C-lens.

5. The apparatus of claim 4, wherein the optical filter is of square shape.

6. The apparatus of claim 4, wherein the second tube has an inner dimension flexible enough to accommodate the optical filter that comes in a predefined size range.

7. The apparatus of claim 4, wherein the second optical lens is secured to the second holding tube by applying an epoxy adhesive only to a portion of the second optical lens and a portion of the second holding tube.

8. The apparatus of claim 4, wherein there is a short free-space between the filter and the C-lens lens to meet a focal point of the C-lens lens.

9. The apparatus of claim 4, wherein each of the first and second holding tubes has an optical axis, the first and second holding tubes are concatenated off the optical axis of either one of the first and second holding tubes to compensate a possible variance of a front surface curvature of the C-lens.

10. The apparatus of claim 2, wherein each of the first and second holding tubes as well as the third and fourth tubes is of glass material.

11. An optical apparatus comprising:
    a first glass tube provided to accommodate a first optical lens;
    a second glass tube provided to accommodate an optical filter, the first glass tube and the second glass tube being concatenated and bonded to form a holding tube, wherein the first glass tube and the second glass tube have two different dimensions; and
    a third glass tube, provided to accommodate a second optical lens, concatenated and bonded to the holding tube to form a sub-assembly, wherein, when the sub-assembly is inserted in a sleeve, only either one of the holding tube and the third tube is secured to the sleeve to reduce a risk that, during a thermal condition change, any metal and glass material expansion will not cause the sub-assembly to be under stress that would otherwise be present when both of the holding tube and the third tube are secured to the sleeve.

12. The apparatus of claim 11, further comprising:
    a fourth glass tube, provided to accommodate a fiber pigtail with two fiber cores, concatenated and bonded with the holding tube; and
    a fifth glass tube provided to accommodate a fiber with one fiber core, concatenated and bonded with the third glass tube.

13. The apparatus of claim 11, wherein the first optical lens is secured to the first glass tube, and only a portion of the first glass tube and the first optical lens are applied with an epoxy adhesive to reduce a stress-related optical loss of the apparatus.

14. The apparatus of claim 13, wherein the second optical lens is secured to the third glass tube, and only a portion of the third glass tube and the second optical lens are applied with an epoxy adhesive to reduce the stress-related optical loss of the apparatus.

15. The apparatus of claim 13, wherein the first optical lens is a GRIN lens and the second optical lens is a C-lens.

16. The apparatus of claim 13, wherein either one of the first optical lens and the second optical lens is a GRIN lens.

17. The apparatus of claim 12, wherein in the first optical lens is a GRIN lens and the second optical lens is a C-lens, and wherein each of the first, second, third, fourth and fifth tubes has an optical axis, the first, second, third, fourth and fifth tubes are so concatenated to be slightly off the optical axis of either one of the first, second, third, fourth and fifth tubes to compensate a possible variance of a front surface curvature of the C-lens.

18. A method for providing an optical apparatus, the method comprising:
    forming a sub-assembly including a GRIN lens and an optical filter coaxially aligned;
    inserting the GRIN lens of the sub-assembly into a first glass tube;
    concatenating a second glass tube to the first glass tube by bonding both of the tubes to form a holding tube, wherein the first glass tube and the second glass tube have two different dimensions; and
    inserting an optical lens in a third glass tube, the third glass tube concatenated and bonded to the holding tube to form another sub-assembly, wherein, when the another sub-assembly is inserted in a sleeve, only either one of the holding tube and the third tube is secured to the sleeve to reduce a risk that, during a thermal condition change, any metal and glass material expansion will not cause the another sub-assembly to be under stress that would otherwise be present when both of the holding tube and the third tube are secured to the sleeve.

19. The method of claim 18, further comprising:
inserting a fiber pigtail with two fiber cores into a fourth glass tube that is concatenated and bonded with the holding tube; and
inserting a fiber with one fiber core into a fifth glass tube that is concatenated and bonded with the third glass tube.

20. The method of claim 19, wherein the GRIN lens is secured to the first glass tube, and only a portion of the first glass tube and the GRIN lens are applied with an epoxy adhesive to reduce a stress-related optical loss of the apparatus.

21. The method of claim 18, wherein the optical lens is secured to the third glass tube, and only a portion of the third glass tube and the optical lens are applied with an epoxy adhesive to reduce the stress-related optical loss of the apparatus.

22. The method of claim 21, wherein the optical lens is one of a GRIN lens or a C-lens.

23. The method of claim 18, wherein the optical lens is a C-lens, and each of the first, second, third, fourth and fifth tubes has an optical axis, the first, second, third, fourth and fifth tubes are so concatenated to be slightly off the optical axis of either one of the first, second, third, fourth and fifth tubes to compensate a possible variance of a front surface curvature of the C-lens.

* * * * *